May 3, 1966 A. STEGHERR 3,249,469
SEMICONDUCTIVE MATERIAL, SEMICONDUCTIVE
AND THERMOELECTRIC DEVICES
Filed Oct. 17, 1961

INVENTOR
ARNOLD STEGHERR
BY Frank R. Jeifari
AGENT

United States Patent Office 3,249,469

Patented May 3, 1966

3,249,469

SEMICONDUCTIVE MATERIAL, SEMICONDUCTIVE AND THERMOELECTRIC DEVICES

Arnold Stegherr, Aachen, Germany, assignor to North American Philips Company, Inc., New York, N.Y., a corporation of Delaware Filed Oct. 17, 1961, Ser. No. 145,563
Claims priority, application Netherlands, Oct. 22, 1960, 257,146
3 Claims. (Cl. 136—4)

This invention relates to semiconductive materials and semiconductive bodies made of such materials, and their use in semiconductor devices, more particularly in thermoelectric devices such as thermogenerators, Peltier cooling devices and thermoelectric heat pumps.

The invention is based inter alia on the surprising discovery that, in the ternary Ag-Sb-Te system, a homogeneous phase with semiconductive properties occurs with a composition corresponding approximately to the chemical formula $2Ag_2Te.3Sb_2Te_3$ and that the homogeneous semiconductive phase has exceptionally suitable thermoelectric properties within a given partial zone of its existence range, on the tellurium-rich side as hereinafter defined, thus rendering this phase particularly suitable for use as a thermoelectric member in thermoelectric devices, such as thermogenerators which are operated at high temperatures, more particularly between about 300° C. and 500° C.

A semiconductive material according to the invention consists at least substantially of, or is built up on the basis of, a homogeneous Ag-Sb-Te phase having a gross composition corresponding to, or located between, the compositions:

(21.4 at. percent of Ag; 26.8 at. percent of Sb; 51.8 at. percent of Te)
20.0 at. percent of Ag; 26.8 at. percent of Sb; 53.2 at. percent of Te)
(18.0 at. percent of Ag; 28.8 at. percent of Sb; 53.2 at. percent of Te)

in which the element Ag may be replaced, if desired, by one or more of the elements Cu, Tl, Au for at most 30 at. percent, the element Sb may be replaced, if desired, by one or more of the elements Bi and As for at most 50 at. percent, and the element Te may be replaced, if desired, by one or more of the elements Se and S for at most 50 at. percent.

The invention also relates to semi-conductor bodies made of such semi-conductive materials.

Since a semi-conductive material according to the invention is monophasal or at least substantially monophasal, it may be manufactured and treated further in a homogeneous and reproducible manner, also when using the melting or remelting method, without troublesome differences in composition being necessarily involved due to segregation of a second phase, as is well-known, the thermoelectric properties of a semiconductive material also become poorer due to the presence of a second phase if this phase is present in considerable concentrations of, for example, 10% or 20%. Thus, a second phase is unfavourable more particularly if the polarity of the thermo-E.M.F. of the second phase is opposite to that of the main constituent, as would be the case, for example, if $Ag_2Te$ as a second phase were present to a considerable amount in the semiconductive material according to the invention. In fact, this results in a decrease of the effective thermo-E.M.F. and gives rise to an increase of the heat-conductivity due to the occurrence of an internal Peltier effect between the two phases. Monophasalness is also desirable, however, for obtaining a low heat-conductivity of the lattice since heterogeneous additions, such as $Ag_2Te$ and $Sb_2Te_3$, which have a heat-conductivity higher than that of a semiconductive material according to the invention, result in an increased heat-conductivity.

In this connection it is to be noted that it has previously been suggested to use a compound of the composition $AgSbTe_2$ as a semiconductive material in semiconductor devices, such as, for example, diodes and thermoelectric devices. However, such material has a composition other than that of a semiconductive material according to the invention and during experiments carried out in connection with the present invention it has been found that $AgSbTe_2$ is either monophasal, nor can be made monophasal, but is heterogeneous due to the presence of a considerable amount of $Ag_2Te$ as a second phase so that the disadvantages previously referred to arise. However, in the range of compositions of a semiconductive material according to the invention, after sufficient reaction of the constituents or compounds, a monophasal material is obtained, or at least a substantially monophasal material having exceptionally good semiconductive properties, more particularly also in thermoelectric respect, namely an optimum thermoelectric quality factor $$Z=\frac{\alpha^2\sigma}{\lambda}$$

wherein $\alpha$ is the thermo-E.M.F. in volts/per ° C., $\sigma$ is the electric conductivity in $\Omega^{-1}$cm.$^{-1}$ and $\lambda$ is the heat-conductivity in watts/cm.° C.

A semi-conductive material according to the invention is suitable for use in a semiconductor device having a semiconductive body with one or more current-supply electrodes such as, for example, in diodes or photo-electric devices. The absence of a second phase, at least in interfering amounts, ensures a homogeneous electric conduction through the body.

However, a semi-conductive material according to the invention is highly suitable for use in thermo-electric devices such as Peltier cooling devices, heat pumps and preferably in thermo-generators which are operated at a high temperature, more particularly between about 300° C. and 550° C. For this purpose a thermo-electric device according to the invention comprises at least one thermoelectric member of a semiconductive material according to the invention. More particularly the thermoelectric material is suitable to be added as a p-type member in a thermoelectric cell to another member, preferably of a suitable n-type semi-conductive material. The particular location on the tellurium-rich side of the compositions of a semiconductive material according to the invention in the existence range of the homogeneous Ag-Sb-Te-phase found, which latter composition may be indicated with good approximation by $2Ag_2Te.3Sb_2Te_3$, also permits of obtaining an optimum low value for the heat conductivity, since in the range of compositions of a semiconductive material according to the invention, the higher concentration of cation vacancies due to the excess of tellurium results in increased phonon scattering and thus a smaller heat conductivity than in the remaining portion of the existence range of this phase.

In the manufacture of a semiconductive material according to the invention, the constituents and/or one or more compounds or alloys thereof in the finely-divided state and in the specified composition are caused to react by means of a thermal treatment, preferably in an atmosphere free of oxygen, in accordance with the manufacturing method usually employed for such semiconductive materials, these constituents and/or compounds or alloys subsequently being converted, at least substantially, into a homogeneous phase of a corresponding composition. Thus, the homogeneous phase may be manufactured by subjecting a finely-divided pulverulent mixture of the specified composition, if desired after pressing together, to a thermal treatment and sintering it until the phase has formed. However, preferably a homogeneous melt of the constituents and/or compounds or alloys in the specified composition is manufactured, for example by heating to a temperature from 600° C. to 1000° C. and subjecting the coagulation product obtained from the melt to a thermal treatment for further conversion into the homogeneous phase. In order to avoid undesirable inhomogeneities in the composition of the reaction product, the melt is coagulated preferably by chilling, for example in air or in a liquid, for example water or oil, the coagulation product obtained from the melt subsequently being homogenized by the thermal treatment. The melt may be chilled to the ambient temperature and the resulting coagulation product then subjected to the homogenizing treatment in a separate step. It is also possible, however, to cool the melt and the coagulation product obtained therefrom at a very slow rate only, thus subjecting it to the thermal treatment, or to cool only to the homogenizing temperature and to carry out the thermal treatment at this temperature.

Experiments underlying the present invention have also shown that the homogeneous phase with Ag, Sb and Te as components is formed peritectically from melt and $Sb_2Te_3$ at about 575° C. and decomposes into $Ag_2Te$ and $Sb_2Te_3$ at a temperature from 300° C. to 350° C., that is to say at about 330° C. The last-mentioned transition temperature may, however, be different and probably lower for semi-conductive materials according to the invention manufactured on the basis of the homogeneous Ag-Sb-Te phase due to the aforementioned partial replacement of one or more of the components.

The thermal treatment and the homogenizing treatment must therefore be carried out above the transition temperature of the relevant semiconductive material. The thermal treatment may be effected at a temperature from about 320° C. to 575° C. Preferably, the temperature of the treatment is chosen between 450° C. and 540° C. since in this temperature range the conversion takes place rapidly, the phase width is large and trouble due to partial melting of the material is not encountered. After the thermal treatment and after homogenization, the reaction product is preferably chilled, for example in air or in a liquid, so that at least the temperature range from 330° C. to about 250° C., or the temperature range from 330° C. to room temperature, is rapidly traversed and the decomposition into $Ag_2Te$ and $Sb_2Te_3$ is substantially avoided and even the formation of seeds thereof does not occur.

The thermal treatment is preferably carried out in vacuo although other inert atmospheres free of oxygen such, for example, as an atmosphere of rare gas or $N_2$ may also be used for this purpose. During the thermal treatment or during the previous melting process, an atmosphere containing tellurium may advantageously be used, if desired, for inhibiting the evaporation of tellurium.

The invention also relates to a semiconductive material or a semiconductor body made of a semiconductive material obtained by the use of a method according to the invention.

In order that the invention may be readily carried into effect, it will now be described more fully, by way of example, with reference to the accompanying drawing.

Figure 1:
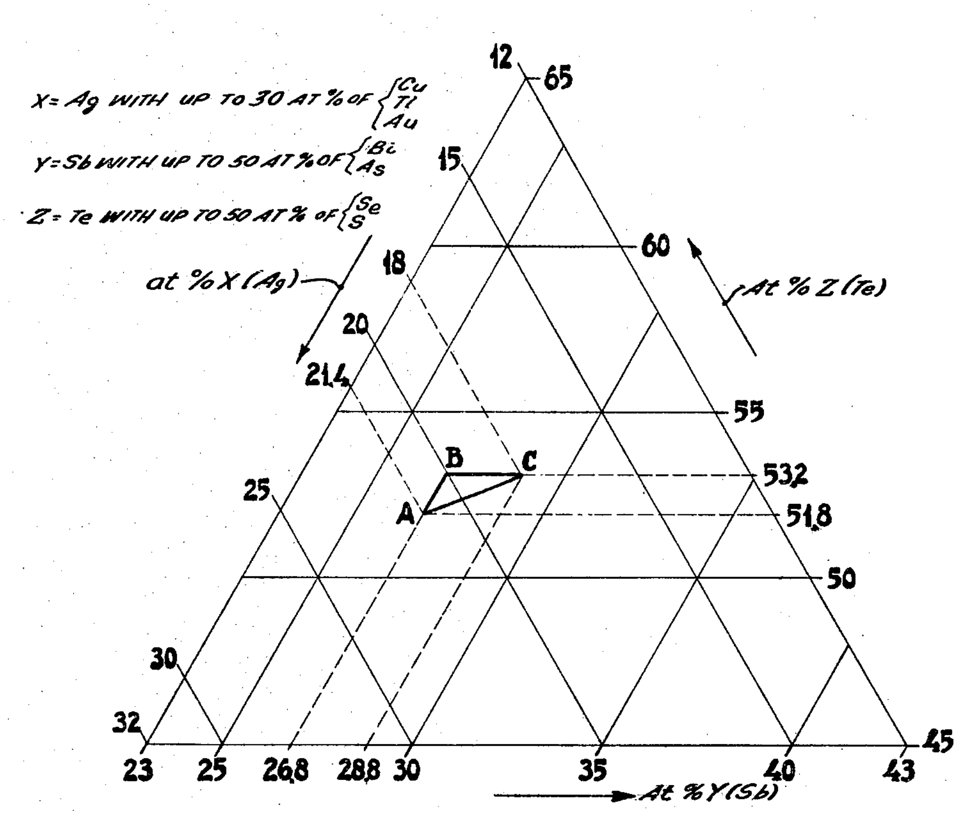
FIGURE 1 shows a portion of the ternary Ag-Sb-Te diagram.

A portion of the ternary Ag-Sb-Te diagram is shown on an enlarged scale in FIGURE 1 for the sake of clarity. The contents of Ag, Sb and Te are plotted therein at. percent in the usual manner along the short sides of the triangle, the content of Ag in this figure being limited from 12 at. percent to 32 at. percent, the content of Te from 45 at. percent to 65 at. percent and the content of Sb from 23 at. percent to 43 at. percent. Lines of equal Ag-content are parallel to the right-hand upright side of the triangle and the content of Ag may be read along the left-hand upright side of the triangle. Lines of equal Sb-content are parallel to the left-hand upright side of the triangle and the content of Sb may be read along the base of the triangle. Lines of equal Te-content are parallel to the base of the triangle and the content of Te may be read along the right-hand upright side.

In this figure the composition (21.4 at. percent of Ag; 26.8 at. percent of Sb; 51.8 at. percent of Te) is indicated by point A, the composition (20.0 at. percent of Ag; 26.8 at. percent of Sb; 53.2 at. percent of Te) is indicated by point B and the composition (18.0 at. percent of Ag; 28.8 at. percent of Sb; 53.2 at. percent of Te) is indicated by point C. These three points A, B and C form the corner points of a triangle ABC.

The semiconductive material according to the invention consists, at least substantially, of a homogeneous phase Ag-Sb-Te having a composition corresponding to, or located between the compositions A, B and C, that is to say the compositions of the semiconductive material according to the invention are represented in this ternary diagram by the compositions located on the short sides of the triangle ABC or inside the triangle ABC. The semiconductive material according to the invention may also be built up on the basis of this homogeneous Ag-Sb-Te phase, in which event one or more of the components Ag, Sb or Te may be replaced in the described manner by the other elements previously indicated while retaining a gross composition located on or inside the triangle ABC.

By starting from the constituents and/or alloys or compounds thereof (if desired from compounds or alloys which, upon heating, change to these constituents or alloys or compounds thereof) and subjecting them in the specified gross composition to the thermal treatment for a sufficiently long time, a homogeneous phase is obtained or at least a material which substantially consists only of a homogeneous phase having good semiconductive properties and more particularly good thermoelectric properties.

Figure 2:
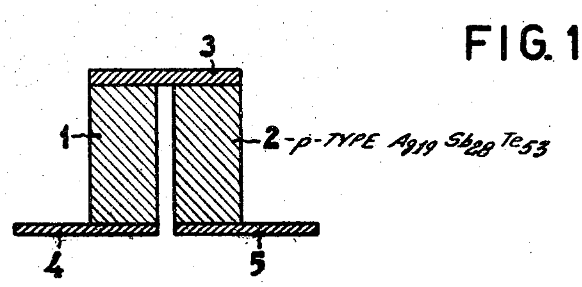
FIGURE 2 shows diagrammatically a longitudinal section of a thermoelectric cell according to the invention.

FIGURE 2 shows, by way of example, a longitudinal section of a thermoelectric device according to the invention in an arrangement usually employed. Two rectangular rods 1 and 2 constitute the thermoelectric members of an elementary thermoelectric cell. In practice a plurality of such elementary cells are usually connected in series and thus united to form a thermoelectric device built up of a plurality of elements. In such a thermoelectric device according to the invention, at least one thermoelectric member consists of the semiconductive material according to the invention and preferably the thermoelectric member made of the semiconductive material according to the invention, for example the p-type member 2, is combined in an elementary thermoelectric cell with an n-type member, for example of another n-type semiconductive material such, for example, as n-type PbTe. Plates 3, 4 and 5 consists of material of good electric conductivity and are secured to the rods 1 and 2, for example by soldering. When such a thermoelectric cell is used as a peltier cooling device or a heat pump, a current is passed through the cell and extracts heat, for example from the plate 3, and supplies the heat to the plates 4 and 5 as a function of the direction of the current. The plate 3 is then thermally connected to the space to be cooled and the plates 4 and 5 are thermally connected to the medium from which the heat is dissipated, for example cooling fins. When used as a thermo-generator, one plate, for example plate 3, is brought into thermal contact with the heat source and the plates 4 and 5 are brought into thermal contact with a medium at a lower temperature so that a thermo-E.M.F. is generated in the cell.

A semiconductive material according to the invention is particularly suitable for use in a thermogenerator which is operated at a high temperature, for example from 300°

C. to 550° C. If the semiconductive material according to the invention has a transition temperature below which the homogeneous phase decomposes, though at a very slow rate, as is the case for example with the Ag-Sb-Te-phase according to the invention at approximately 330° C., the semiconductive material must, of course, be used under conditions in which such disintegration cannot become harmful such as, for example, at temperatures far below the transition temperature, or in a thermoelectric device or an intermediate stage thereof which in practice is always operated above the transition temperature. The decomposition process below the transition temperature otherwise takes place so slowly that during warming-up upon switching on and off, or during operation for a short period below the transition temperature, the disintegration cannot become harmful or, in further operation at a higher temperature, the homogeneous phase is rapidly regenerated again.

A description now follows, by way of example, of the manufacture of a semiconductive material according to the invention having a composition according to the chemical formula $Ag_{19}Sb_{28}Te_{53}$.

In order to obtain the specified composition, 6.0000 gms. of Ag, 9.9708 gms. of Sb and 19.7983 gms. of Te were weighed out and introduced into a quartz tube which, after having been exhausted to about $10^{-2}$ Torr, was closed by melting. The last decimal for the volatile components Sb and Te was found by rounding off upwards.

The quartz tube was subsequently heated to a temperature of about 700° C. in a resistance oven until the whole charge had melted. After shaking the tube to obtain a homogeneous melt, the tube was rapidly removed from the oven and chilled in air to room temperature in order to inhibit undesirable inhomogeneous segregations in the coagulation product during coagulation. The homogeneous phase has already partly formed in the charge during this rapid cooling. According as the melt is cooled more slowly, the content of homogeneous phase in the charge becomes larger, but the possibility of undesirable segregations then also increases.

Subsequently, the resulting rod was heated at about 530° C. for about 280 hours and thus homogenized, whereupon it was chilled in water. The annealing and cooling times can be varied between large limits and can for each case be determined experimentally in an easy way. They will among others depend on the form and quantity of the charge. A metallographic test showed that the rod was wholly monophasal. Upon measurement the following advantageous values for the thermoelectric magnitudes were found:

Thermo-E.M.F. $\alpha=+230$ $\mu$v./° C.
Electric conductivity $\sigma=200\ \Omega^{-1}\text{cm.}^{-1}$
Heat conductivity $\lambda=6.5\ 10^{-3}$ watt/cm. ° C., which amounts to a thermoelectric quality factor $$Z=\frac{\alpha^2\sigma}{\lambda}=1.62\ 10^{-3}/°C$$

The said magnitudes were measured at room temperature (20° C.); however, even more favourable values for Z, $\lambda$ and $\alpha$ may be expected at higher temperatures, for example, between 300° C. and 550° C.

Semiconductive materials according to the invention in which the Ag is partly replaced by Cu, Tl or Au, for example $Ag_{17}Cu_2Sb_{28}Te_{53}$, or the Sb is partly replaced by Bi or As, for example $Ag_{19}Bi_3Sb_{25}Te_{53}$, or the Te is partly replaced by S or Se, for example $Ag_{19}Se_8Sb_{28}Te_{45}$, may be manufactured in an analogous manner by subjecting these components in the specified composition to the same thermal treatment.

A semiconductive material according to the invention may also be manufactured by molding a pulverulent mixture of the components or compounds thereof and causing it to react by a thermal treatment, followed by sintering. The duration of the treatment required therefor is, however, considerably longer. It is much more advantageous in practice to melt together the components and/or compounds for alloys and pulverise the resulting coagulation product and carry out the homogenizing treatment and sintering treatment on the bodies formed from this powder. The mechanical treatment and formation of the bodies is effected in this case in a simple manner. In conclusion, it is to be noted that many further modifications may be made by an expert within the scope of the invention. Thus, it is also possible, for example, to activate the initial material in the manner usual for this technique, with small contents of impurities such as halogens or elements from additional groups in order to act upon the conductivity thereof.

What is claimed is:

1. A semiconductive material consisting essentially of a homogeneous phase having a composition falling within the triangle ABC of the ternary diagram illustrated in FIG. 1, wherein:

*A*=21.4 at. percent X; 26.8 at. percent Y; 51.8 at. percent Z;

*B*=20.0 at. percent X; 26.8 at. percent Y; 53.2 at. percent Z;

*C*=18.0 at. percent X; 28.8 at. percent Y; 53.2 at. percent Z;

X represents silver with up to 30 at. percent of the silver replaced by at least one member selected from the group consisting of copper, thallium and gold;

Y represents antimony with up to 50 at. percent of the antimony replaced by at least one member selected from the group consisting of bismuth and arsenic;

Z represents tellurium with up to 50 at. percent of the tellurium replaced by at least one member selected from the group consisting of selenium and sulfur.

2. A semiconductor device comprising a semiconductive body consisting essentially of the material of claim 1, and at least one electrode contacting said body.

3. A thermoelectric device comprising a pair of thermoelectric members, one of said members being of p-type conductivity and constituted of the material of claim 1, the other of said members being of n-type conductivity, and means contacting spaced regions of the pair of bodies.

References Cited by the Examiner

UNITED STATES PATENTS

| | | | |
|---|---|---|---|
| 2,602,095 | 7/1952 | Faus | 136—4.2 |
| 2,762,857 | 9/1956 | Lindenblad | 136—4.2 |
| 2,882,468 | 4/1959 | Wernick | 252—62.3 |
| 2,995,613 | 8/1961 | Wernick | 136—5 |

OTHER REFERENCES

Rosi (ed.), "Thermoelectric materials for power conversion, bi-monthly progress reports Nos. 1 and 2, combined. Covering the period April 1, 1959–July 31, 1959." Report date: Aug. 10, 1959.

Wernick et al.: "Three-element semi-conductor materials." In "Electronics," vol. 33, No. 7, February 12, 1960, pp. 103–8.

WINSTON A. DOUGLAS, *Primary Examiner.*

JOHN H. MACK, *Examiner.*

J. H. BARNEY, A. M. BEKELMAN, *Assistant Examiners.*